July 25, 1961  S. H. ELLISON, JR  2,993,620
ARTICLE COUNTING AND CONTROLLING MECHANISM
Filed Sept. 3, 1959  8 Sheets-Sheet 1
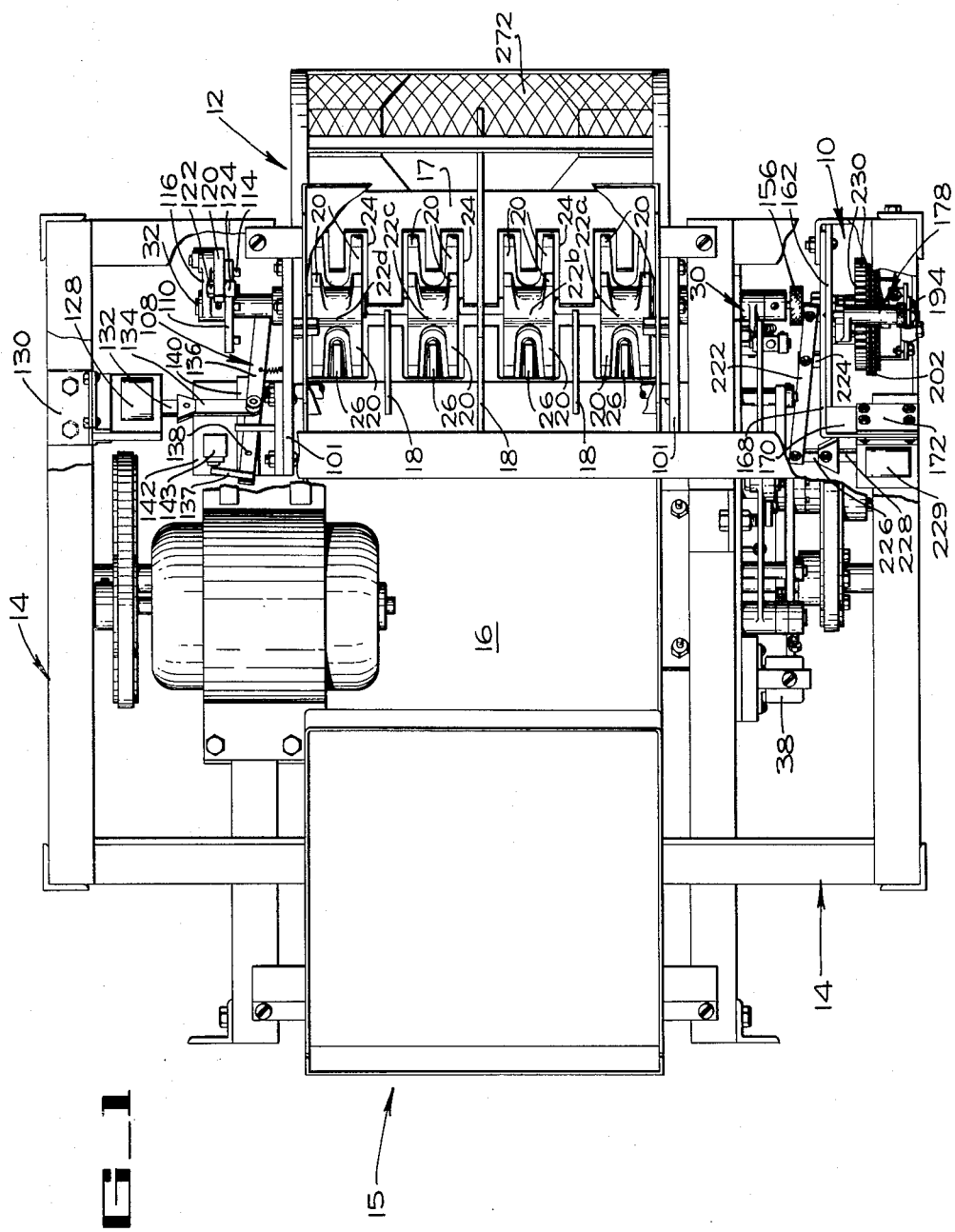
FIG_1
INVENTOR
SAMUEL H. ELLISON, JR.
BY *Hans G. Hoffmeister.*
ATTORNEY July 25, 1961  S. H. ELLISON, JR  2,993,620
ARTICLE COUNTING AND CONTROLLING MECHANISM
Filed Sept. 3, 1959  8 Sheets-Sheet 2
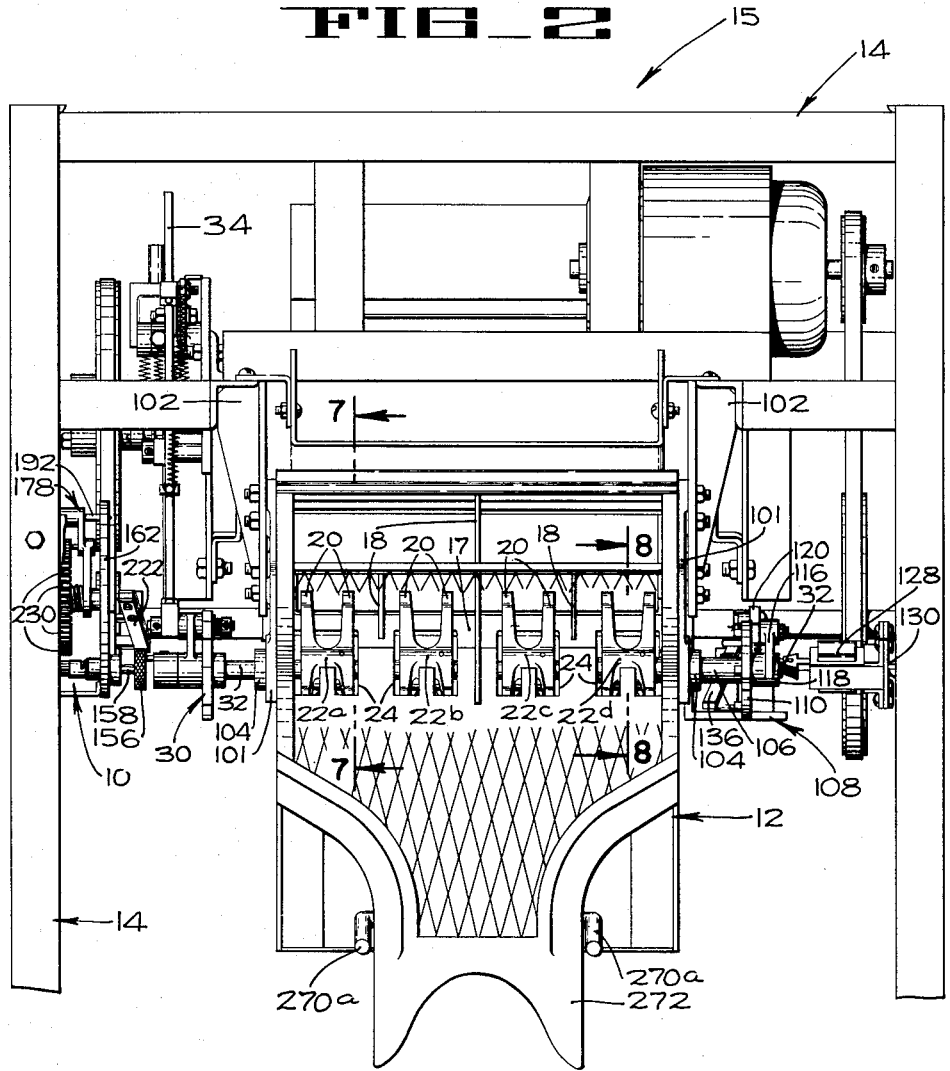
INVENTOR
SAMUEL H. ELLISON, JR.
BY *Hans G. Hoffmeister*
ATTORNEY

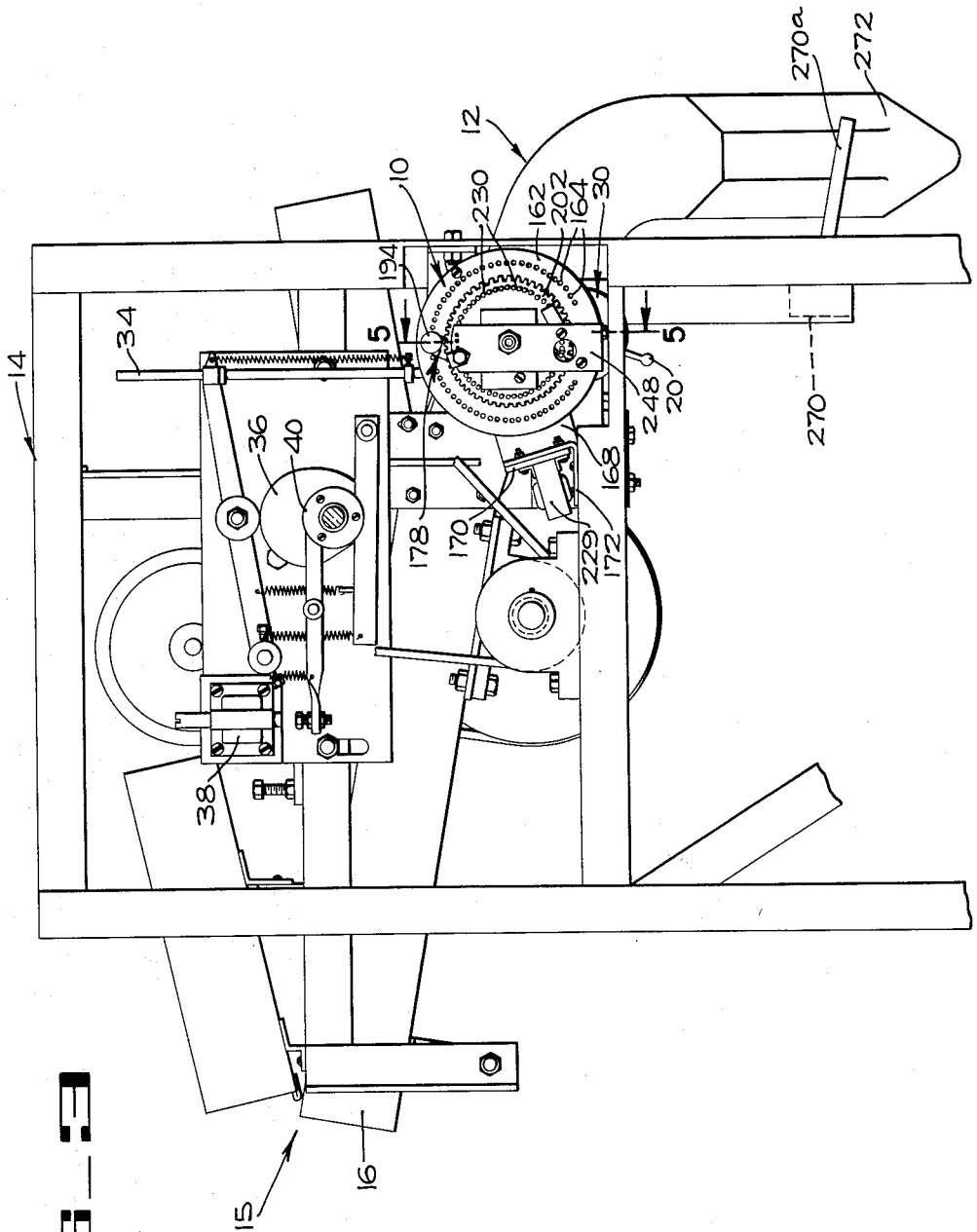

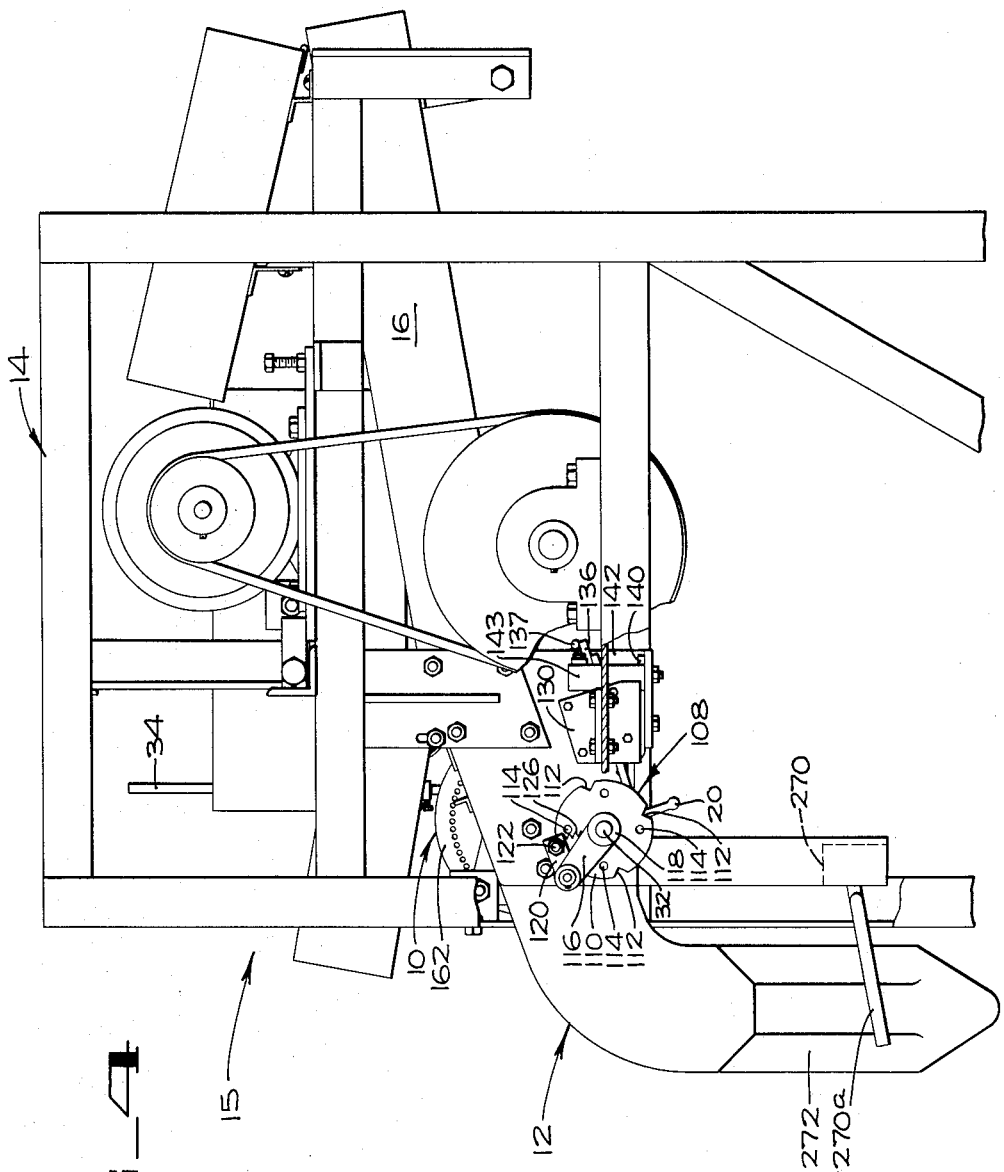

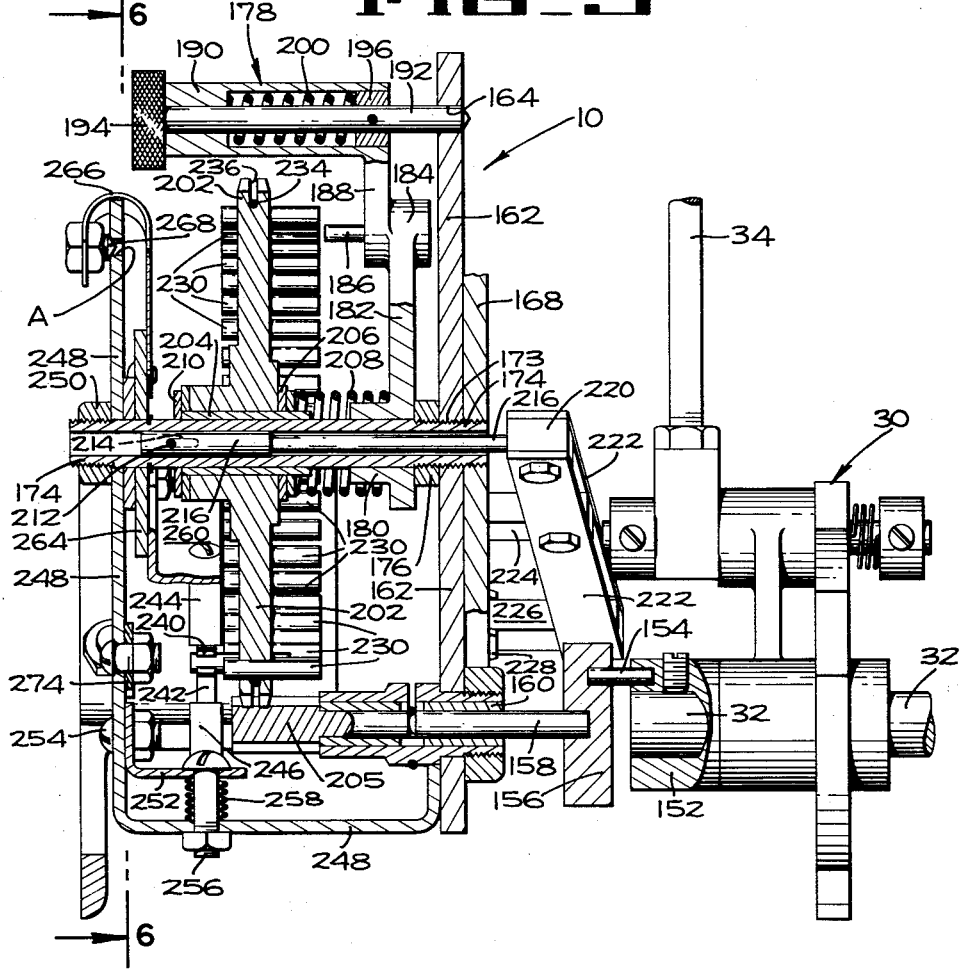

July 25, 1961  S. H. ELLISON, JR  2,993,620
ARTICLE COUNTING AND CONTROLLING MECHANISM
Filed Sept. 3, 1959  8 Sheets-Sheet 6
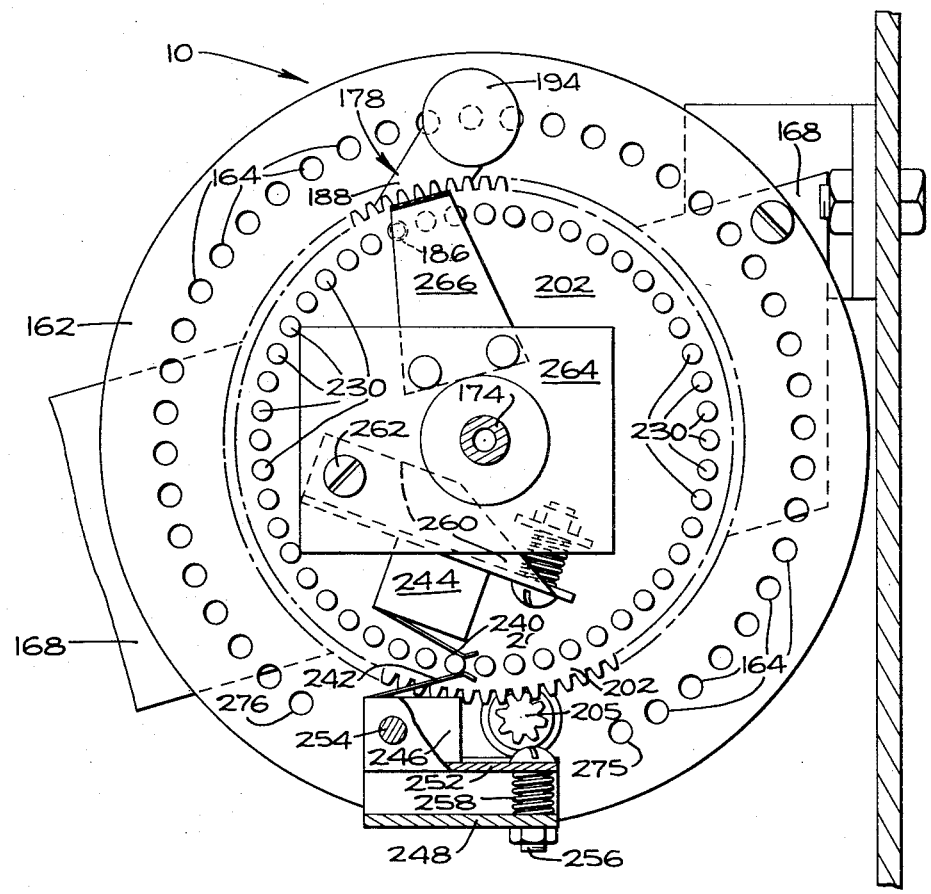
INVENTOR
SAMUEL H. ELLISON, JR.
BY *Hans G. Hoffmeister*
ATTORNEY

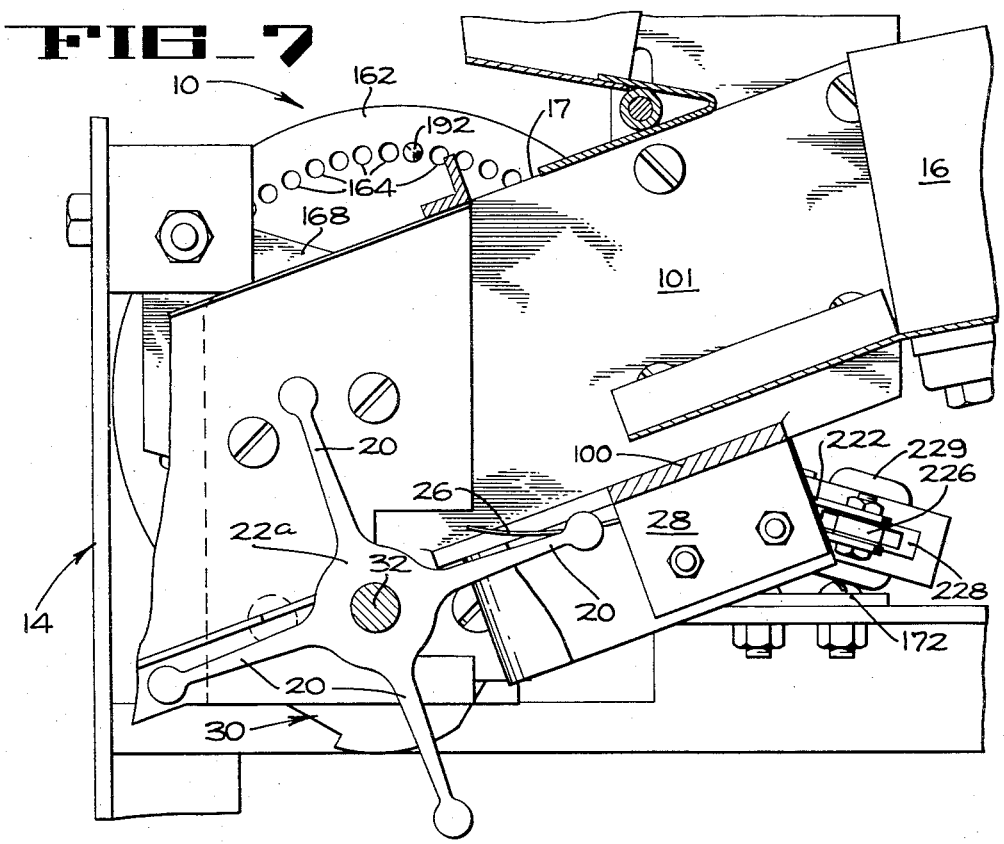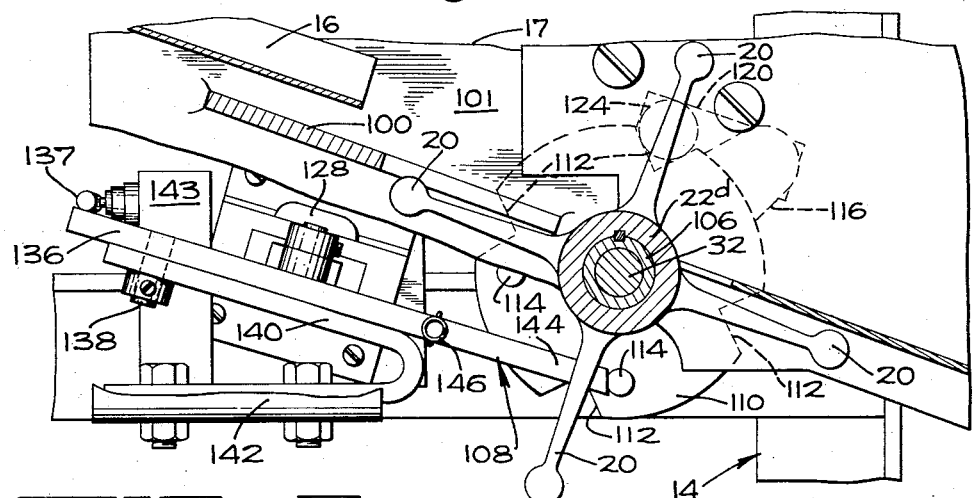

July 25, 1961  S. H. ELLISON, JR  2,993,620
ARTICLE COUNTING AND CONTROLLING MECHANISM
Filed Sept. 3, 1959  8 Sheets-Sheet 8
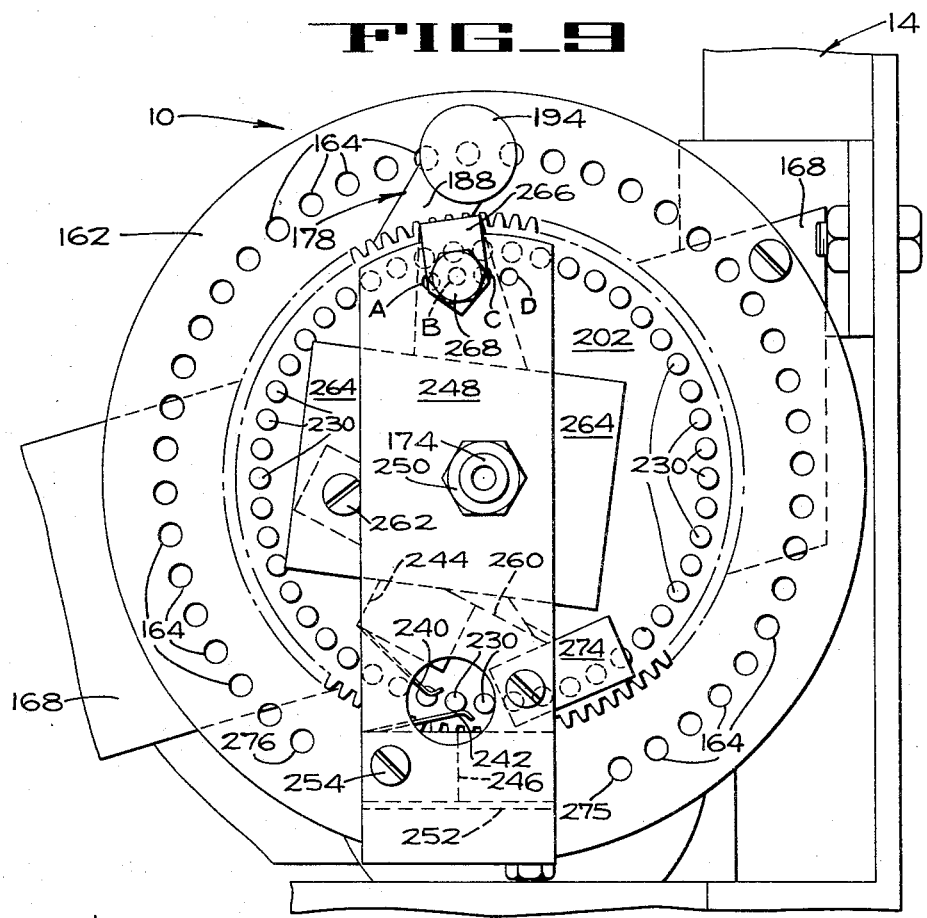
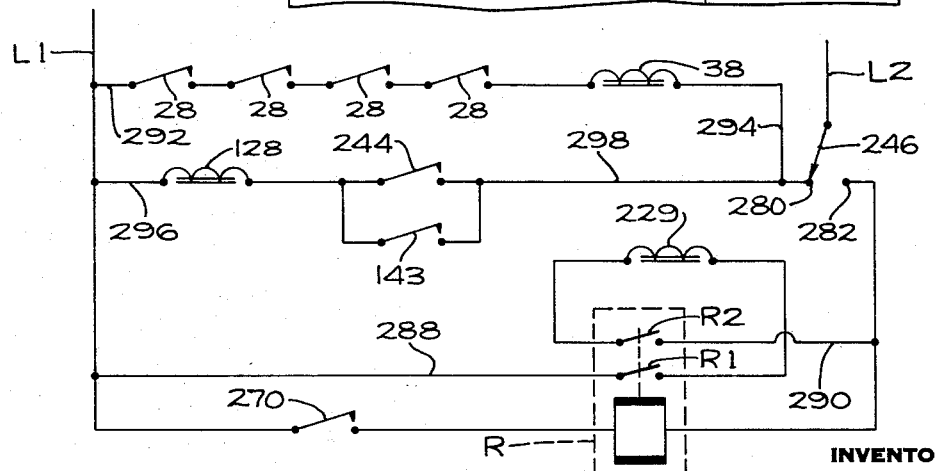
INVENTOR
SAMUEL H. ELLISON, JR.
BY Hans G. Hoffmeister
ATTORNEY 2,993,620
ARTICLE COUNTING AND CONTROLLING
MECHANISM
Samuel H. Ellison, Jr., Lakeland, Fla., assignor to Food Machinery and Chemical Corporation, San Jose, Calif., a corporation of Delaware
Filed Sept. 3, 1959, Ser. No. 837,911
23 Claims. (Cl. 221—7)

The present invention pertains to counting apparatus and more particularly relates to counting apparatus adapted to count and control a flow of articles such as fruit.

The present invention comprises a mechanical counting mechanism and an associated flow controlling mechanism which together are capable of automatically counting and discharging groups of articles until a desired total count has been reached. As soon as is desired after the completion of one counting and discharging operation, the cycle may be repeated for any number of successive counting and discharging operations. The article counting and controlling mechanism may easily be adapted to any one of a variety of conveying or discharging apparatuses, including belts, chutes, hoppers or processing machines and will positively and accurately count and discharge any of a wide variety of articles.

Accordingly, an object of the present invention is to provide an improved mechanism for counting articles and for controlling a flow of the articles.

Another object of the present invention is to provide an improved article counting and flow controlling mechanism which may be adapted to existing flow lines or processing machines.

Another object of the invention is to provide an improved mechanism for counting and controlling articles which is capable of successive counting cycles in rapid order.

Another object of the invention is to provide an improved article counting and controlling mechanism particularly adapted to handling articles which may be of different weight and size.

These objects, as well as other objects and advantages of the present invention, will become evident from the following description and the accompanying drawings, in which:

FIGURE 1 is a top plan partly broken away of a filling machine having the article counting and controlling mechanism of the present invention incorporated therein.

FIGURE 2 is a rear, or discharge end elevation of the machine of FIGURE 1.

FIGURE 3 is a right side elevation of the machine of FIG. 1.

FIGURE 4 is a left side elevation of the machine of FIG. 1.

FIGURE 5 is an enlarged, longitudinal, vertical section of the counting mechanism of the present invention, taken on lines 5—5 of FIGURE 3.

FIGURE 6 is a transverse vertical section through the counting mechanism, taken on lines 6—6 of FIGURE 5.

FIGURE 7 is an enlarged vertical section taken on lines 7—7 of FIGURE 2, illustrating part of the article control mechanism.

FIGURE 8 is a section similar to FIGURE 7, but with certain parts broken away, and is taken on lines 8—8 of FIGURE 2.

FIGURE 9 is a partial side elevation of the counting mechanism of the present invention, certain parts being in a different position than that shown in FIG. 6.

FIGURE 10 is an electrical wiring diagram of the control circuit of the present invention.

With particular reference to FIGURES 1 and 3, the article counting mechanism 10 and article controlling mechanism 12 of the invention are mounted on the frame 14 of a fruit handling machine 15 the structural and opreational details of which do not constitute a part of the present invention and will, therefore, be only briefly described herein. For a full description of the machine 15, reference may be had to application of W. C. Belk et al., Serial No. 770,821, filed October 30, 1958, and entitled Container Filling Apparatus, said application being assigned to the assignee of the present application. For the purposes of the present disclosure, it will suffice to explain that a conveyor, not shown, deposits fruit into an inclined hopper 16 which is continuously vibrated to keep the fruit therein free to roll to the lower end of the hopper 16 and into a more steeply inclined stationary discharge hopper 17 (FIGS. 7 and 8). At the lower end of the chute 16 and within the stationary hopper 17 the fruit is guided into four single file lanes defined by separator plates 18 (FIG. 1), and the leading fruit in each lane comes to rest against an upstanding paddle 20 of one of four star wheels 22a, 22b, 22c and 22d, respectively. Each star wheel includes four of the paddles 20 and is mounted for rotation at the discharge end of the stationary hopper 17 which is provided with notches 24 to accommodate the paddles 20. A switch actuating arm 26 is disposed in each notch 24 and each switch arm 26 is adapted to close a normally open star wheel switch 28 when a fruit is positioned against the associated star wheel.

As a fruit is discharged from any of the star wheels, the next fruit in the associated lane rolls into contact with the following paddle 20 of the star wheel. When all of the star wheels 22a, 22b, 22c, and 22d have fruit thus positioned, the same sequence of operation automatically repeats and continues to repeat until the desired total count of fruit has been discharged into a bag or the like. When the total count is attained, the counting and discharging mechanism automatically stops and is ready for another counting and discharging cycle as soon as the operator removes the filled bag and arranges an empty bag in position to receive the next count of fruit.

If the counting mechanism 10 is set to indicate a desired total count of four fruit or a multiple thereof, all of the star wheels discharge fruit until the total is reached and the flow controlling mechanism 12 is automatically stopped. However, if the counting mechanism 10 is set for a number of fruit, such as seven, that is not divisible by four, one of the star wheels is held inactive during part of the time the other star wheels are rotated. Therefore, the total count is reduced by the number of fruit withheld by the one star wheel not rotated.

Any suitable drive means which is responsive to an electrical control and will rotate the star wheels in 90° increments may be substituted for the drive means illustrated. Because the particular drive means shown is not a part of the present invention, only a general description thereof will be necessary for the present disclosure. The star wheels are rotated in one-quarter revolution increments by a pawl and ratchet assembly 30 (FIG. 5) which is mounted upon one end of the shaft 32 supporting the four star wheels 22a, 22b, 22c and 22d. Only the star wheels 22a, 22b and 22c are affixed to the shaft 32, while the fourth star wheel 22d is mounted on the shaft 32 for free rotation relative thereto, as will be more fully explained in the description to follow. The pawl and ratchet assembly 30 is arranged to impart a one-quarter turn to the shaft 32 each time an actuating rod 34 is reciprocated, and the rod 34 is caused to reciprocate once each time a cam 36 (FIG. 3) experiences one full turn. The cam 36 is under the control of a solenoid 38 which when energized, trips a single revolution clutch 40, rotating the cam 36 one full turn, and thus causing the star wheel shaft 32 to turn ninety degrees.

The stationary hopper 17, in which the star wheel shaft 32 is disposed, is comprised of a base portion or floor 100 (FIGS. 7 and 8) extending transversely across the discharge end of the machine, and a vertical wall 101 at each side of the floor 100. A support bracket 102 (FIG. 2) is bolted to each side wall 101 and welded to the frame 14 of the filling machine 15. An extension of configuration similar to that of the feed hopper 16 is thus provided by the stationary hopper 17, as well as a mounting base for the shaft 32 which carries the star wheels.

A bearing 104 (FIG. 2) journals each end of the star wheel shaft 32 and each bearing 104 is secured to the outside face of a side wall 101 of the hopper 17. The star wheels 22a, 22b, and 22c are secured to the shaft 32 for rotation therewith. The fourth star wheel 22d (FIG. 8) is secured to a sleeve 106 rotatable upon the shaft 32. Thus each time the solenoid 38 is energized the star wheels 22a, 22b and 22c are rotated, as hereinabove explained, and the star wheel 22d is either allowed to rotate simultaneously therewith, or is held inactive by a solenoid-operated control or lock-out unit 108 (FIGS. 1 and 8), actuated by the closing of a switch which is a part of the article counter 10 and which will be described hereinbelow.

The sleeve 106 to which the star wheel 22d is secured extends through the adjacent bearing 104 and is welded to a notched disc 110 (FIGS. 1, 4 and 8), provided with four equally spaced peripheral notches 112. On the inner face of the disc 110, adjacent each notch 112, is welded a stop pin 114 (FIGS. 1 and 8) adapted to be engaged by a stop member presently to be described. A short length of the star wheel shaft 32 projects beyond the outside face of the disc 110 and a radially extending drive arm 116, having a hub portion 118, is secured to the shaft. One end of a link 120 is pivoted to the inside face of the free end of the arm 116 and a stud 122 is secured to the link 120 near its opposite end. A drive roller 124 (FIG. 1), in the plane of the disc 110, is freely rotatable on the stud 122 and a tension spring 126 (FIG. 4) attached to the free end of the arm 120 and to the hub 118, urges the drive roller 124 into firm engagement in one of the four notches 112 of the disc 110. Therefore, when the shaft 32 is rotated, the roller 124 provides a releasable driving engagement to rotate the disc 110 and the star wheel 22d coupled to the disc 110 by the sleeve 106. If the lock-out unit 108 is actuated to stop the disc 110, as will next be explained, the drive roller 124 will leave whichever notch 112 within which it is engaged and idle over the periphery of the disc 110 while the star wheel 22d remains motionless.

Included in the lock-out unit 108 is a star wheel control solenoid 128 (FIGS. 1 and 8) which is bolted to a bracket 130 fixed to the frame 14. The armature 132 of the solenoid 128 is connected by a link 134 to a pivoted stop bar 136. A pivot pin 138 (FIG. 8) is welded to the stop bar 136 intermediate its ends and is rotatably mounted on one leg of a substantially V-shaped support bracket 140 which is bolted to the horizontal flange of an angle bracket 142. The vertical flange of the bracket 142 is bolted to the adjacent wall 101 of the stationary hopper 17.

The stop bar 136 has a switch actuating arm 137 welded to one end thereof in position to open a normally closed holding switch 143 fixed to the bracket 142. The function of the holding switch 143 will be explained in conjunction with the hereinbelow description of the electrical circuit of the apparatus.

Near the opposite end 144 (FIGS. 1 and 8) of the stop bar 136, a tension spring 146 is connected to the bar 136 and to the adjacent wall 101 of the stationary hopper 17. When the star wheel control solenoid 128 is not energized, the end 144 of the stop bar 136 is urged away from the notched disc 110 by the spring 146 to lie in a plane removed from the path of the stop pins 114. When the star wheel solenoid 128 is energized, the bar 136 is pivoted to move its end 144 against the face of the disc 110 from which the pins 114 project, in which position the end 144 will intercept the lowermost stop pin 114 carried by the disc 110 and thus stop the disc. As was previously mentioned, the star wheel 22d is coupled to the disc 110. Consequently, the star wheel 22d is prevented from rotating and the discharge of fruit from that star wheel is stopped when the solenoid 128 is energized.

Near the end of a fruit counting cycle for any total desired number of which the mechanism of the present invention is capable other than a multiple of four, the star wheel 22d is prevented from rotation in the above described manner in order to limit the total number of discharged fruit. Thus for a total desired count which is three more than four or any multiple of four, only the star wheels 22a, 22b and 22c would be allowed one last 90° increment of rotation while at the same time the star wheel 22d would be prevented by the lock-out unit 108 from rotating at all. As a further example, if the star wheel shaft 32 were rotated in 90° increments through one full revolution, each of the three star wheels 22a, 22b and 22c would discharge four fruit, making a total of twelve fruit discharged from these three star wheels. If the star wheel 22d were at the same time allowed to rotate a like amount, the number of fruit discharged would be increased by four for a total discharged number of sixteen fruit. If the star wheel 22d were allowed only three increments of rotation, only three fruit would be discharged by that star wheel and the total number of fruit discharged would be fifteen.

It will be understood, therefore, that every time the counting and discharging of a number of fruit that is a multiple of four is desired, all of the star wheels 22 rotate, but that any count other than a multiple of four, within the capabilities of the machine can be obtained by restricting the rotation of the star wheel 22d during the last one or more revolutions of the star wheel shaft 32.

The end of the shaft 32 on which the pawl and ratchet assembly is mounted (FIG. 5) has a collar 152 secured thereto, near the outer periphery of which is secured an axially projecting drive pin 154 that rotates the mechanism of the counter 10 every time the star wheel shaft 32 is rotated. The pin 154 is received in a suitable aperture in a drive collar 156 secured to a pinion shaft 158 that is journaled in a bearing sleeve 160 of the counter mechanism 10. The bearing sleeve 160 extends through a stationary circular index plate 162 (FIGS. 1, 3, 5, 6, and 9) of the counter 10 which is provided with a circular array of spaced apertures 164 (FIGS. 6 and 9). Adjacent each aperture 164, but not illustrated herein, and index mark identifying that particular aperture with a certain desired count is stamped into the plate 162.

Support for the fixed index plate 162 is provided by an inclined flat support plate 168 (FIGS. 3, 5, 6 and 9) that is bolted at its upper end to the frame structure 14. The lower end of the support plate 168 is provided with a right angle offset portion 170 (FIG. 3) bolted to an angle bracket 172 that is secured to the frame 14. The index plate 162 is provided with a threaded central aperture 173 (FIG. 5) in which is screwed one end of a tubular shaft 174. A nut 176 threaded onto the shaft 174 and tightened against the outer face of the index plate 162 locks the shaft 174 against rotation.

A selector arm 178 (FIGS. 1, 3, 5, 6, and 9), having a hub portion 180 slidably mounted on the shaft 174 adjacent the locking nut 176, includes a radially extending first section 182 having a hub 184 at the end thereof opposite the hub 180. The hub 184 is provided with a laterally projecting selector pin 186 and has a second section 188 of the arm 178 extending radially outward and angularly offset from the first section 182. At its outer end, the arm section 188 has an elongate, laterally projecting hub 190 in which is mounted a locking pin 192 for axial movement therein. The inner end of the locking pin 192 is bevelled for ease of insertion into one of the apertures 164 in the index plate 162 and the outer end has an enlarged knurled grip portion 194. A collar 196 secured to the pin 192 is disposed within a cylindrical recess 198 in the hub portion 190. A spring 200 under compression between the base of the recess 198 and the collar 196 urges the locking pin 192 toward the index plate 162. The operator may select any one of the apertures 164 to be engaged by the locking pin 192 by pulling the knurled grip 194 to disengage the pin 192 and then rotating the selector arm 178 around the shaft 174 until the locking pin 192 is aligned with the desired hole 164. Releasing the grip 194 then allows the spring 200 to move the pin 192 into the selected hole 164.

A spur gear 202, fixed to a bearing sleeve 204 which is freely rotatable and slidable on the shaft 174, is meshed with a drive pinion gear 205 (FIGS. 5 and 6) secured to the pinion shaft 158. Each time the star wheels are turned to discharge fruit the gear 202 is rotated by the pinion gear 205 in a counterclockwise direction as viewed in FIGURE 6.

A thrust washer 206 (FIG. 5) abuts the inner face of the spur gear 202, and a compression spring 208 is interposed between the thrust washer 206 and the selector arm 178 to urge the gear 202 away from the selector arm 178. Axial movement of the spur gear 202 away from the selector arm 178 is limited by a washer 210 that abuts a retaining pin 212 extending transversely through the tubular shaft 174. Each end of the pin 212 is received in the ends of oppositely disposed slots 214 (only one of which is shown) provided in the wall of the tubular shaft 174 and extending toward the selector arm 178 in order to allow limited movement of the pin 212 in that direction.

The spur gear 202 may be moved axially on the shaft 174 by means including a gear-actuating rod 216 (FIG. 5) disposed within the tubular shaft 174. The retaining pin 212 is rigid with the rod 216 which is connected to a block 220 which is pivotally connected to one end of a crank arm 222. The crank arm 222 is pivoted intermediate its ends to a bar 224 fixed to the mounting plate 168. The other end of the crank arm 222 is connected by a link 226 to the armature 228 of a counter reset solenoid 229 (FIGS. 1 and 3). The reset solenoid 229 is bolted to the offset portion 170 of the mounting plate 168. When the solenoid 229 is energized, the crank arm 222 is pivoted, thus moving the rod 216 and the pin 212, and causing the spur gear 202 to be moved axially inward against the force of the spring 208. As this occurs the gear 202 remains meshed with the pinion gear 205. When the solenoid 229 is de-energized, the spring 208 returns the gear 202 to its position farthest removed from the selector arm 178.

A circular array of memory pins 230 (FIGS. 5, 6 and 9) extend through suitably spaced apertures in the spur gear 202, parallel to its axis of rotation and spaced therefrom the same distance as the selector pin 186. The angular spacing of the pins 230 corresponds to the number of degrees that the gear 202 is turned each time the star wheel shaft 32 experiences a quarter turn. Consequently, the gear or rotor 202 and the pins 230 carried thereby advance an angular distance equal to the center-to-center spacing of the pins each time the star wheels 22a, 22b, and 22c discharge fruit.

All of the memory pins 230 are axially movable in the gear or carrier 202 and are retained in their respective apertures in the gear by an elastic ring 234. The ring 234 is tensioned and is disposed in a peripheral groove 236 of the gear 202. The groove 236 is cut sufficiently deep for the elastic ring 234 to contact all of the memory pins 230. Any one of the memory pins 230 may be mechanically projected into an active position outwardly of the spur gear 202, or to an inactive position inwardly of said gear, and in either position the elastic ring 234 effectively retains the memory pin in selected position.

When the locking pin 192 of the selector arm 178 has been inserted in one of the holes 164 of the index plate 162, the selector pin 186 of the selector arm 178 will be axially aligned with one of the memory pins 230 and when the reset solenoid 229 is energized to shift the gear 202, the pin 186 will prevent that memory pin 230 from moving with the gear. Thus that memory pin is shifted relatively to the gear 202 to an active position outwardly of the gear 202. Thus, when the gear 202 is returned to its FIG. 5 position, the projected pin 230 will contact two switch actuating arms 240 and 242 (FIGS. 5, 6, and 9) as the gear 202 is rotated during a fruit counting and discharging cycle.

The switch actuator 240 is connected to a normally open lock-out switch 244 that is wired in the electrical circuit which controls the lock-out solenoid 128, and hence the star wheel 22d. The switch actuator 242 is connected to a control switch 246 which through an electrical circuit connected to one of its double set of contacts controls the actuation of the solenoid 38 that governs movement of the actuator rod 34, and hence the star wheel shaft 32.

Mounting means for the switch 246 includes an L-shaped strap 248 (FIGS. 5, 6 and 9) the horizontal leg of which is welded to the fixed index plate 162. The fixed tubular shaft 174 projects through the other leg of the strap 248 and is secured therein by a nut 250. The switch 246 is adjustably mounted on the strap 248 by an angle bracket 252 (FIG. 6) pivoted at one side to the inner face of the vertical leg of the strap 248 by a bolt 254 and having at the opposite side an adjustment bolt 256 which extends through the horizontal portion of the strap 248. A compression spring 258 encircles the bolt 256 and is interposed between the strap 248 and the angle 252 so that the switch 246 may be adjusted to the most advantageous spacing from the memory pins 230 by turning the bolt 256.

A similarly adjustable mounting for the switch 244 is provided by an angle bracket 260 (FIGS. 5 and 6) pivoted by a bolt 262 to a rectangular mounting plate 264. The mounting plate 264 is rotatably mounted upon the fixed tubular shaft 174 adjacent the inner side of the L-shaped strap 248 and has a spring steel indexing arm 266 riveted thereto. A curved outer end of the indexing arm 266 (FIGS. 5 and 9) hooks over the upper end of the strap 248 and has a pointed indexing bolt 268 secured to the curved portion which is adapted to be engaged with one of four index holes A, B, C, and D (FIG. 9), that are provided in the strap 248 and are so marked. By springing and pivoting the indexing arm 266, the bolt 268 may be aligned with any desired one of the index holes A, B, C and D. When the arm 266 is released, it springs back to its former position and inserts the bolt 268 in the aligned index hole.

In FIGURES 5 and 9, it may be seen that rotative movement of the indexing arm 266 will likewise rotate the mounting plate 264 and its attached lock-out switch 244. If the indexing arm bolt 268 is inserted in the index hole A, the two switch actuating arms 240 and 242 will be in position to be actuated simultaneously by an active memory pin as is illustrated in FIGURES 5 and 6. Therefore, at the end of a counting and discharging cycle during which the switch arms 240 and 242 are positioned to be simultaneously actuated, the star wheel 22d controlled by the switch 244, and the star wheels 22a, 22b and 22c controlled by the switch 246, will be stopped at the same time. It will be evident, therefore, that the number of fruit discharged during that cycle, according to which one of the memory pins 230 was in the active position, will be either four or a multiple of four because all star wheels 22a to 22d, inclusive, will be rotated to discharge fruit.

When the indexing arm 266 (FIG. 9) is positioned to insert its index bolt 268 in the hole B the lock-out switch 244 is moved a distance equal to the spacing between adjacent memory pins and in the direction from which an active memory pin 230 approaches it. Therefore the lock-out unit 108 will be energized to stop the star wheel 22d 90° before the star wheels 22a, 22b and 22c have stopped. From FIGURE 9 it can be clearly understood how the actuator arm 240 of the lock-out switch 244 is actuated to stop the star wheel 22d before the other star wheels are stopped. Whatever the total number of fruit that would be discharged if all of the star wheels 22 rotated would therefore be reduced by one. It is accordingly evident that placing the indexing arm 266 in the next index hole C will withhold two fruit and that in the index hole D it will withhold three fruit. Obviously then, by moving the selector arm 178 and causing to be moved to an active position one particular memory pin 230, and by presetting the indexing arm 266, any desired count of fruit which is within the range provided by the total number of memory pins 230 may be had.

Upon completion of a fruit counting and discharging cycle for a number of fruit divisible by four, the switch actuators 240 and 242 are disposed as shown in FIGURE 6. When the filled bag has been removed and replaced with an empty bag, the operator actuates a starting switch 270 which is mounted adjacent the discharge chute 272 (FIGS. 2–4) whereby the fruit released from the star wheels 22a, 22b, 22c and 22d is conveyed into bags. The actuating lever 270a of the starting switch projects adjacent the chute 272 so that the switch 270 is closed as an empty bag is placed in receiving position upon the chute 27. Closing the switch 270 energizes the solenoid 229 that moves the gear 202 axially inward (FIG. 5). The active memory pin 230 disposed between the two switch actuating arms 240 and 242 is moved inwardly with the gear 202 and thus allows the two actuating arms to open the contacts of their respective switches. At the same time a different memory pin 230 is caused to be moved to an active position by the selector pin 186. When the gear 202 returns to its former position the previously active memory pin contacts the edges of the switch actuators 240 and 242 and is pushed into an inactive position. If a count not divisible by four was made, only the switch arm 242 (FIG. 9) will contact the previously active memory pin and push it to an inactive position. The star wheels 22 begin to rotate and discharge fruit and the memory pin 230 which was returned to an inactive position by the switch arms 240 and 242 is carried into engagement with a fixed cam plate 274 (FIG. 9) which is bolted to the strap 248. The cam plate 274 provides positive means for camming into inactive position any memory pins 230 that may have passed the switches 244 and 246 without being returned to inactive position as above described.

It will be evident that by positioning the selector arm 178 to engage its locking pin 192 in the index plate hole 164 that is indicated at 275 (FIGS. 6 and 9), the maximum obtainable count will be had. The smallest obtainable number will be counted when the locking pin 192 is positioned in the hole 164 indicated at 276. A suitable reference plate, not shown, is provided on the frame 14 adjacent the counter 10, which shows the proper setting of the selector arm 178 and of the indexing arm 266 to obtain any count within the range of the counter 10. For example, in order to have the counter 10 stop the article control 12 after one hundred and sixty eight fruit are discharged, the reference plate indicates that the indexing arm 266 must be placed with its bolts 268 at A and that the selector arm 178 must have its locking pin 192 in the hole indicated at 275. With the same A setting and the pin 192 in the hole at 276, a count of four fruit is had.

A brief summary of the operation of the apparatus will be made in conjunction with an explanation of the wiring diagram (FIG. 10). Electrical energy is supplied to the apparatus by service lines L1 and L2. When each star wheel has a fruit positioned against the upstanding one of its paddles 20, the switch actuator 26 of its associated star wheel switch 28 is depressed. The four star wheel switches 28 are connected in series with each other between the service line L1 and a contact 280 of the control switch 246 located in the counting mechanism 10.

At the end of a cycle wherein four fruit (or a number of fruit which is a multiple of four) were discharged the active memory pin 230 then being used comes to rest in a position actuating the arm 242 of the switch 246. In that position, the switch 246 provides an electrical path from the other service line L2 to its contact 282.

When the operator has placed an empty bag on the outlet of the discharge chute 272 and has moved the starting switch actuator 270a to close the starting switch 270, a circuit is completed from the line L1 through the switch 270, a control relay R, and the contact 282 of switch 246, to the other service line L2. Contacts R1 and R2 of the relay R are thereby closed and lines 288 and 290 conduct current from L1 and L2 through the counter reset solenoid 229, thereby shifting the gear 202 which carries the memory pins 230 and causing a new memory pin to be made active. The actuator arm 242 of switch 246 is at the same time disengaged by the previously active memory pin 230 and an electrical path from L1 is thereby provided within the switch 246 to its contact 280. Current is thus carried by line 292, the four series connected switches 28 and line 294 to energize the clutch solenoid 38 and cause the star wheels 22 to rotate and discharge fruit.

The star wheels will continue to discharge fruit until the one active memory pin which was moved to an active position when the counter reset solenoid 229 shifted the gear 202 contacts the switch actuator arms 240 and 242 of switches 244 and 246, respectively. When the actuator 242 of switch 246 is moved by the active memory pin 230, electrical continuity from L2 through the contact 280 is broken. The clutch solenoid 38 is thus de-energized and the star wheels cease to discharge fruit. At the same time, an electrical path is completed through the contact 282 of switch 246 so that when the starting switch 270 is again actuated, it will again energize the control solenoid 229 to again shift the gear 202 and begin a new counting and discharging cycle after the filled bag is removed and an empty one substituted.

The above described cycle was for a total count of four fruit, or some multiple of four, because all four star wheels were stopped at the same time. If a total count is desired which is not four or a multiple of four and within the capability of the apparatus, the indexing arm 266 is placed at the appropriate setting according to the setting shown on the reference plate. Thus the lock-out switch 244 is shifted in the direction from which the active memory pin will approach it. Therefore the lock-out switch 244 will be closed and the star wheel 22d will be stopped before the clutch switch 246 is closed. Current is carried from L1 by a line 296, through the lock-out solenoid 128, the switch 244, a line 298 and switch 246 to the service line L2. The stop arm 136 is thereby pivoted to block the lowermost stop pin 114 and the star wheel 22d is stopped.

In order to keep the lock-out solenoid 128 energized after the actuator 240 of the lock-out switch 244 can no longer be depressed by the active memory pin moving by it, the holding switch 143 located in the normally open lock-out unit 108 is wired in parallel with the switch 244. When the lock-out unit is actuated, the switch arm 137 mounted on the stop arm 136 is moved away from the actuator of the lock-out switch 143 and its contacts are permitted to close and to remain closed until the active memory pin 230 contacts the switch arm 242 which then breaks continuity from line L2 to line 298, de-energizing the clutch solenoid 38 and stopping the star wheels 22a, 22b, and 22c.

From the foregoing description, it will be seen that the mechanism of the present invention provides a simplified article counter and control mechanism capable of rapid operation and adapted to handle articles irrespective of substantial variations in their size and weight. By minor changes in the mounting of certain of its parts, the mechanism provided can be attached to a wide variety of flow lines or machines in order to count and control a flow of articles. Particularly advantageous is the manner in which the memory pin for a new counting and discharging cycle is made active at the same time the previously used memory pin is made inactive in order to effect a rapid sequence of identical counting and discharging cycles.

While a particular embodiment of the present invention has been shown and described, it will be understood that the device is capable of modification and variation without departing from the principles of the invention and that the scope of the invention should be limited only by the scope and proper interpretation of the claims appended hereto.

The invention having thus been described, that which is believed to be new and desired to be protected by Letters Patent is:

1. Apparatus for dispensing a certain total number of articles comprising a plurality of article dispensing devices, means for repeatedly actuating all but one of the dispensing devices, yieldable means urging said one dispensing device to operate each time the other dispensing devices are actuated, means for inactivating said one dispensing device when the number of articles dispensed by all of the dispensing devices operating simultaneously is a predetermined number less than said total number, and means for interrupting operation of said other dispensing devices when they have been simultaneously actuated a number of times sufficient to dispense said predetermined number subsequently to inactivation of said one dispensing device.

2. Apparatus for dispensing a certain total number of articles comprising a plurality of article dispensing devices, means for repeatedly actuating all but one of the dispensing devices, yieldable means urging said one dispensing device to operate each time the other dispensing devices are actuated, means for inactivating said one dispensing device when the number of articles dispensed by all of the dispensing devices operating simultaneously is a predetermined number less than said total number, means for interrupting operation of said other dispensing devices when they have been simultaneously actuated a number of times sufficient to dispense said predetermined number subsequently to inactivation of said one dispensing device, and adjustable control means operably connected to said interrupting means for varying the number of times all of the dispensing devices operate simultaneously before being interrupted.

3. Apparatus for dispensing a certain total number of articles comprising a plurality of article dispensing devices, means for repeatedly actuating all but one of the dispensing devices, yieldable means urging said one dispensing device to operate each time the other dispensing devices are actuated, means for inactivating said one dispensing device when the number of articles dispensed by all of the dispensing devices operating simultaneously is a predetermined number less than said total number, means for interrupting operation of said other dispensing devices when they have been simultaneously actuated a number of times sufficient to dispense said predetermined number subsequently to inactivation of said one dispensing device, and adjustable control means operably connected to said inactivating means for varying said predetermined number.

4. Apparatus for dispensing a certain total number of articles comprising a plurality of article dispensing devices, means for repeatedly actuating all but one of the dispensing devices, yieldable means urging said one dispensing device to operate each time the other dispensing devices are actuated, means for inactivating said one dispensing device when the number of articles dispensed by all of the dispensing devices operating simultaneously is a predetermined number less than said total number, means for interrupting operation of said other dispensing devices when they have been simultaneously actuated a number of times sufficient to dispense said predetermined number subsequently to inactivation of said one dispensing device, adjustable control means operably connected to said interrupting means for varying the total number of times said other dispensing devices operate before their operation is interrupted, and adjustable control means operably connected to said inactivating means for varying said predetermined number.

5. Article counting and controlling apparatus comprising means defining a plurality of lanes within each of which a single file procession of articles is advanced, a star wheel rotatably mounted in position to receive articles from each of said lanes, each of said star wheels having a plurality of peripheral recesses, each recess being adapted to receive a predetermined number of the articles at a time and to temporarily arrest advance thereof, means for successively turning all of said star wheels simultaneously to discharge articles therefrom in groups, and means operable after all of said star wheels have been turned simultaneously to discharge a predetermined number of said groups for immobilizing one of said star wheels while the other star wheels continue to be simultaneously turned to receive and discharge smaller groups of the articles.

6. Article counting and controlling apparatus comprising a conveyor for advancing a flow of articles to be counted, a plurality of star wheels rotatably mounted in position to receive articles from the conveyor; each of said star wheels having a plurality of recesses, each adapted to receive one of the articles at a time, means for turning all of said star wheels simultaneously to successively discharge therefrom groups of the articles, each group consisting of the number of articles that corresponds to the number of star wheels, and means operable after all of said star wheels have been turned simultaneously to discharge a predetermined number of said groups of articles for immobilizing one of said star wheels while the other star wheels continue to be simultaneously turned to receive and discharge a predetermined number of smaller groups of articles.

7. Article counting and controlling apparatus comprising a hopper, means within the hopper dividing the same into a plurality of lanes within which articles to be counted are advanced, a star wheel rotatably mounted in each lane in position to receive articles therefrom, each of said star wheels having a plurality of recesses, each recess being adapted to receive one of the articles at a time and to temporarily arrest advance thereof, means for successively turning all of said star wheels simultaneously to discharge articles therefrom in groups, each consisting of the number of articles that is equal to the number of star wheels, and means operable after all of said star wheels have been turned simultaneously to discharge a predetermined number of said groups of articles for immobilizing one of said star wheels while the other star wheels continue to be simultaneously turned to receive and discharge articles a predetermined number of times.

8. Article counting and controlling apparatus comprising a conveyor for advancing a flow of articles to be counted, a plurality of star wheels rotatably mounted in position to receive articles from the conveyor, each of said star wheels having a plurality of recesses each adapted to receive one of the articles at a time, means for turning all of said star wheels simultaneously to successively discharge therefrom groups of the articles, each group including the number of articles that corresponds to the number of said star wheels, and means operable after all of said star wheels have been turned simultaneously to discharge a predetermined number of groups of articles for immobilizing one of said star wheels while the other star wheels continue to be simultaneously turned to receive and discharge a predetermined number of smaller groups of the articles, the number of article receiving recesses of said one star wheel corresponding to the total number of star wheels.

9. Article counting and controlling apparatus comprising a conveyor for advancing a flow of articles to be counted, a plurality of star wheels rotatably mounted in position to individually receive articles from the conveyor, each of said star wheels having peripheral recesses therein corresponding in number to the number of star wheels, each recess being adapted to receive one of the articles at a time and to temporarily arrest advance thereof, means for successively turning all of said star wheels simultaneously to discharge articles therefrom in groups composed of a number of articles corresponding to the number of star wheels, and means operable after all of said star wheels have been turned simultaneously a predetermined number of times for immobilizing one of said star wheels while the other star wheels continue to be simultaneously turned to receive and discharge articles in groups composed of a number of articles corresponding to the number of said other star wheels.

10. Article counting and controlling apparatus comprising means defining a plurality of lanes within each of which a single file procession of articles is advanced, a star wheel rotatably mounted in position to receive articles from each of said lanes, each of said star wheels having a plurality of peripheral recesses, each recess being adapted to receive a predetermined number of the articles at a time and to temporarily arrest advance thereof, means for successively turning all of said star wheels simultaneously to discharge articles therefrom in groups, means operable after all of said star wheels have been turned simultaneously to discharge a predetermined number of said groups for immobilizing one of said star wheels while the other star wheels continue to be simultaneously turned to receive and discharge smaller groups of the articles, adjustable means operably connected to said immobilizing means for varying the number of times the star wheels are turned prior to immobilization of said one star wheel, and adjustable means operably connected to said star wheel turning means for varying the total number of times said other star wheels are turned.

11. Article counting and dispensing apparatus comprising a conveyor for advancing a flow of articles to be dispensed according to a predetermined count, a plurality of star wheels rotatably mounted in position to individually receive articles from the conveyor, each of said star wheels having peripheral recesses therein corresponding in number to the number of star wheels, each recess being adapted to receive one of the articles at a time and to temporarily arrest advance thereof, means for successively turning all of said star wheels simultaneously to discharge articles therefrom in groups composed of a number of articles corresponding to the number of star wheels, means operable after all of said star wheels have been turned simultaneously a predetermined number of times for immobilizing one of said star wheels while the other star wheels continue to be simultaneously turned to receive and discharge articles in groups composed of a number of articles corresponding to the number of said other star wheels, adjustable means operably connected to said immobilizing means for varying the number of times the star wheels are turned prior to operation of the immobilizing means, and means operably connected to said star wheel turning means for varying the number of times all of the star wheels are turned simultaneously.

12. Apparatus for dispensing articles according to preselected count, comprising means for repeatedly dispensing groups of articles, means operable to modify the number of articles in each group dispensed by the dispensing means, and control means for actuating said modifying means including a rotatably mounted rotor driven in synchronism with said dispensing means, a plurality of pins carried by the rotor in a circular series concentric therewith, each of said pins being longer than the thickness of the rotor and being axially slidable relatively to the rotor between active and inactive positions thereon, and switch means electrically connected to said modifying means in controlling relation therewith and mounted adjacent said rotor in position to be engaged and actuated by one of said pins in the active position thereof.

13. Apparatus for dispensing articles according to preselected count, comprising means for repeatedly dispensing groups of articles, means operable to modify the number of articles in each group dispensed by the dispensing means, and control means for actuating said modifying means including a rotor mounted for rotation about a central axis and for movement along said axis, means connecting the rotor to the dispensing means for rotating the rotor in synchronism with said dispensing means, a plurality of pins carried by the rotor in a circular series centered on said axis, each of said pins being longer than the thickness of the rotor and being axially slidable relatively to the rotor between active and inactive positions thereon, switch means electrically connected to said modifying means in controlling relation therewith and mounted adjacent said rotor in position to be engaged and actuated by one of said pins in the active position thereof, and selector means mounted adjacent the rotor for pivotal movement about said axis and including a selector pin spaced from said axis a distance corresponding to the radius of said circular series of rotor pins, whereby a selected rotor pin is slidable axially relatively to the rotor by axial movement of the rotor while the selector means is disposed with the selector pin aligned with the selected rotor pin.

14. Apparatus for dispensing articles according to preselected count, comprising means for repeatedly dispensing groups of articles, means operable to modify the number of articles in each group dispensed by the dispensing means, and control means for actuating said modifying means including a rotor mounted for rotary movement about a central axis and for movement along said axis, means connecting the rotor to the dispensing means for turning the rotor in synchronism with said dispensing means, a plurality of pins carried by the rotor in a circular series centered on said axis, each of said pins being longer than the thickness of the rotor and being axially slidable relatively to the rotor between active and inactive positions thereon, yieldable means releasably retaining each pin in selected position, switch means electrically connected to said modifying means in controlling relation therewith and mounted adjacent said rotor in position to be engaged and actuated by one of said pins in the active position thereof, and selector means mounted adjacent the rotor for pivotal movement about said axis and including a selector pin spaced from said axis a distance corresponding to the radius of said circular series of rotor pins, whereby a selected rotor pin is slidable axially relatively to the rotor by axial movement of the rotor while the selector means is disposed with the selector pin aligned with the selected rotor pin.

15. Apparatus for dispensing articles according to preselected count, comprising means for dispensing a succession of groups of articles, means operable to modify the number of articles in each group dispensed by the dispensing means, and control means for actuating said modifying means including a rotor mounted for rotation about a central axis and for movement along said axis, means connecting the rotor to the dispensing means for turning the rotor in synchronism with said dispensing means, a plurality of pins carried by the rotor in a circular series centered on said axis, each of said pins being longer than the thickness of the rotor and being axially slidable to project optionally beyond either side of the rotor, switch means connected to said modifying means in controlling relation therewith and mounted adjacent said rotor in position to be engaged and actuated by any of said pins projecting beyond a certain side of the rotor, and selector means mounted adjacent the rotor for pivotal movement about said axis and including an abutment spaced from said axis a distance corresponding to the radius of said circular series of rotor pins, a stationary index plate mounted adjacent the selector means and having a hole therein corresponding to each of the rotor pins, said holes being arranged in a circular series centered on said axis, and a locking pin carried by said selector means selectively receivable in said holes to hold said abutment in alignment with a selected rotor pin.

16. Apparatus for dispensing articles according to preselected count, comprising means for repeatedly dispensing groups of articles, means operable to modify the number of articles in each group dispensed by the dispensing means, and control means for actuating said modifying means including a rotor mounted for rotation about a central axis and for movement along said axis, means connecting the rotor to the dispensing means for rotating the rotor in synchronism with said dispensing means, a plurality of pins carried by the rotor in a circular series centered on said axis, each of said pins being axially slidable relatively to the rotor between active and inactive positions thereon, switch means electrically connected to said modifying means in controlling relation therewith and mounted adjacent said rotor in position to be engaged and actuated by one of said pins in the active position thereof, selector means mounted adjacent the rotor for pivotal movement about said axis and including an abutment spaced from said axis a distance corresponding to the radius of said circular series of rotor pins whereby a selected rotor pin is slid to its active position upon axial movement of the rotor while the selector means is disposed with the selector pin aligned with the selected rotor pin, and means energized upon engagement of said switch means by a rotor pin in its active position for axially moving the rotor toward the selector means to slide another rotor pin to its active position by engagement with said abutment.

17. Apparatus for dispensing articles according to preselected count, comprising means for repeatedly dispensing groups of articles, means operable to modify the number of articles in each group dispensed by the dispensing means, and control means for actuating said modifying means including a rotor mounted for rotation about a central axis and for movement along said axis, means connecting the rotor to the dispensing menas for rotating the rotor in synchronism with said dispensing means, a plurality of pins carried by the rotor in a circular series centered on said axis, each of said pins being axially slidable relatively to the rotor between active and inactive positions thereon, switch means electrically connected to said modifying means in controlling relation therewith and mounted adjacent said rotor in position to be engaged and actuated by one of said pins in the active position thereof, selector means mounted adjacent the rotor for pivotal movement about said axis and including an abutment spaced from said axis a distance corresponding to the radius of said circular series of rotor pins whereby a selected rotor pin is slid to its active position upon axial movement of the rotor while the selector means is disposed with the selector pin aligned with the selected rotor pin, and means energized upon engagement of said switch means by a rotor pin in its active position for axially moving the rotor toward the selector means to withdraw said rotor pin in its active position from engagement with the switch means and to slide another rotor pin to its active position by engagement with said abutment.

18. Apparatus for dispensing articles according to preselected count, comprising means for repeatedly dispensing groups of articles, means operable to modify the number of articles in each group dispensed by the dispensing means, and control means for actuating said modifying means including a rotor mounted for rotation about a central axis and for movement along said axis, means connecting the rotor to the dispensing means for rotating the rotor in synchronism with said dispensing means, a plurality of pins carried by the rotor in a circular series centered on said axis, each of said pins being axially slidable relatively to the rotor between active and inactive positions thereon, switch means electrically connected to said modifying means in controlling relation therewith and mounted adjacent said rotor in position to be engaged and actuated by one of said pins in the active position thereof, selector means mounted adjacent the rotor for pivotal movement about said axis and including an abutment spaced from said axis a distance corresponding to the radius of said circular series of rotor pins whereby a selected rotor pin is slid to its active position upon axial movement of the rotor while the selector means is disposed with the selector pin aligned with the selected rotor pin, means energized upon engagement of said switch means by a first rotor pin in its active position for axially moving the rotor toward the selector means to withdraw said first rotor pin from the switch means and to slide a second rotor pin to its active position by engagement with said abutment, and means for axially moving the rotor away from the selector means upon disengagement of a rotor pin from the switch means, said first rotor pin being returned to its inactive position by abutment against said switch means as the rotor moves away from the selector means.

19. In an article counter, means operable to dispense articles, means operable to selectively control the discharge of articles by said dispensing means, and regulating means for actuating said control means including a movable carrier, means driving said carrier in synchronism with the operation of said dispensing means, a pin mounted on said carrier for movement with respect thereto and disposable thereon in either an active or an inactive position, a switch electrically connected to said control means in controlling relation therewith, and means adjustably mounting said switch adjacent said carrier for varying the location of engagement between said pin and said switch when said pin is in active position.

20. In an article counter, means operable to dispense articles, means operable to selectively control the discharge of articles by said dispensing means, and regulating means for actuating said control means including a carrier having first and second separate movements, first means operable to impart the first of said movements to said carrier in synchronism with operation of said dispensing means, second means for imparting the second of said movements to said carrier, a plurality of pins mounted on said carrier for movement with respect thereto between active and inactive positions, means for moving one of said pins from inactive position to active position, a first switch electrically connected to said control means in controlling relation therewith, a second switch positioned adjacent said carrier for engagement by a first pin when in active position during said first movement of said carrier in synchronism with said dispensing means, said second switch being electrically connected to said second movement imparting means to initiate said second movement of said carrier to thereby move another one of said pins into engagement with said pin moving means to move said last mentioned pin from inactive position to active position, and means adjustably mounting said first switch adjacent said carrier for engagement by said first pin when in active position during synchronous movement of said carrier with said dispensing means for varying the location of said first switch with respect to said second switch to vary the time between actuation of said first and said second switches.

21. In an article counter, means operable to dispense articles, and regulating means for said dispensing means including a carrier having first and a second separate movements, first means operable to impart the first of said movements of said carrier in synchronism with operation of said dispensing means, second means for imparting the second of said movements to said carrier, a plurality of pins mounted on said carrier for movement with respect thereto between active and inactive positions, means for moving one of said pins from inactive to active position, and a switch positioned adjacent said carrier for engagement by one of said pins when in active position during said first movement of said carrier in synchronism with said dispensing means, said switch being electrically connected to said second movement imparting means for initiating said second movement of said carrier to move another of said pins into engagement with said pin moving means to move said last mentioned pin from inactive to active position.

22. In an article counter, means to dispense articles, means for operating said article dispensing means, and regulating means for said operating means including a carrier having first and second separate movements, first means operable to impart the first of said movements to said carrier in synchronism with operation of said dispensing means, second means for imparting the second of said movements to said carrier, a plurality of pins mounted on said carrier for movement with respect thereto between active and inactive positions, means for moving one of said pins from inactive to active position, and a switch positioned adjacent said carrier for engagement by one of said pins when in active position during said first movement of said carrier in synchronism with said dispensing means, said switch being electrically connected to said second movement imparting means to thereby move said one pin out of engagement with said switch and to move another of said pins into engagement with said pin moving means to move said last mentioned pin from inactive to active position.

23. Apparatus for dispensing a total number of articles comprising a plurality of article dispensing devices, said total number of articles being less than a particular multiple of the dispensing devices by a specific number of articles, means for repeatedly actuating all but one of the dispensing devices, yieldable means urging said one dispensing device to operate each time the other dispensing devices are actuated, means for inactivating said one dispensing device when the number of articles dispensed by all of the dispensing devices operating simultaneously is said specific number less than said particular multiple, and means for interrupting operation of said other dispensing devices when they have been simultaneously actuated a number of times corresponding to said specific number subsequently to inactivation of said one dispensing device.

References Cited in the file of this patent

UNITED STATES PATENTS

| | | |
|---|---|---|
| 2,632,588 | Hoar | Mar. 24, 1953 |
| 2,827,875 | Baumstark | Mar. 25, 1958 |
| 2,906,070 | Schecter | Sept. 29, 1959 |